United States Patent Office 3,189,635
Patented June 15, 1965

3,189,635
DIALKYL 1,2-DISUBSTITUTED-ETHYLPHOS-PHONATES AND THEIR PREPARATION
Charles H. Tieman, Modesto, Calif., assignor to Shell Oil Company, New York, N.Y., a corporation of Delaware
No Drawing. Filed July 28, 1961, Ser. No. 127,504
4 Claims. (Cl. 260—461)

This invention relates to a process for the production of organophosphorus compounds wherein an aliphatic carbon atom is bonded to the phosphorus atom and also to a hydroxy group. Novel esters of phosphonic acids, wherein there is bonded to the phosphous atom a 2-alkoxycarbonyl-1-hydroxy-1-alkyl-ethyl group, or a 2-halo analog thereof, these esters being valuable as special-purpose insecticides, form a further aspect of the invention.

In accordance with this invention, it has been discovered that esters and amides of alpha-hydroxyphosphonic acids can be prepared by reacting neutral esters of acids of trivalent phosphorus, or the corresponding amides, in which at least one ester group is alkyl, with ketones in which an aliphatic carbon atom is bonded to the carbonyl carbon atoms and to at least one hydrogen atom, in the presence of methanol or ethanol. The reaction proceeds according to the equation:

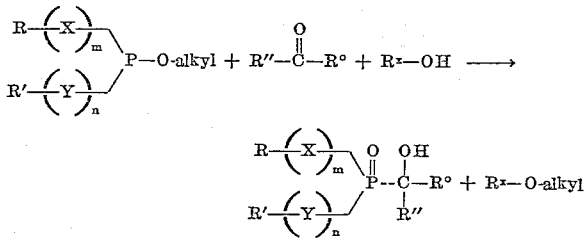

wherein $R^x$ is methyl or ethyl, R, R' and R'' is each a lower molecular weight hydrocarbon or lower molecular weight substituted hydrocarbon group, R° is a lower molecular weight hydrocarbon or lower molecular weight substituted hydrocarbon group bonded to the carbonyl carbon atom by an aliphatic carbon atom which also is bonded to at least one hydrogen atom, m and n is each 0 or 1, X and Y each is —O—, —S—, —NH— or

(wherein $R^a$ is a group of the class represented by R), with the proviso that when m and n are both 1 and X and Y are both —O—, or —S—, R and R' together can represent a divalent group, R and R' each representing one bond of that group. It is to be further understood that when either or both of X and Y are

the groups R and $R^a$, or R' and $R^a$, as the case may be, can together represent a divalent group which together with the indicated nitrogen atom or atoms, as the case may be, forms a heterocyclic group.

In the process of this invention, the suitable phosphorus starting materials are the neutral esters of trivalent phosphorus—i.e., the phosphites, phosphonites and phosphinites—in which an ester group is alkyl, and their amido analogs. Broadly speaking, these starting materials can be defined by the formula:

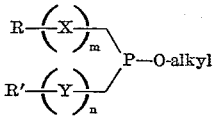

wherein the symbols have the respective meanings already assigned. In the phosphites, m and n are both 1, and X and Y are both oxygen or sulfur; in the phosphonites, m is 1, n is 0 and X is oxygen or sulfur; in the phosphinites, m and n are both 0; in the amidophosphites, m and n are both 1, and either or both of X and Y is amino as hereinbefore described; there are, of course, no amidophosphinites of this kind.

Because of the properties of the phosphonates prepared therefrom, it is preferred that the groups represented by R, R' and $R^a$ contain not more than 10 carbon atoms each. The groups represented by R, R' and $R^a$ can be aliphatic, cycloaliphatic, aromatic, or of mixed structure. When aliphatic, they may be either straight-chain or branched-chain in configuration; they may be saturated or olefinically unsaturated, but preferably are free from acetylenic unsaturation. Type-wise, the suitable hydrocarbon groups include alkyl, cycloalkyl, aryl, aralkyl, and the like. Illustrative examples include the methyl, ethyl, n- and isopropyl groups, the various isomeric butyl, pentyl, hexyl, octyl, nonyl, and the like alkyl groups; the cyclopentyl, cyclohexyl and like cycloalkyl groups; the phenyl group; the naphthyl group, the benzyl, phenethyl, p-methylbenzyl, and alpha-methylbenzyl groups, and like aralkyl groups; the isomeric xylyl groups, the ethylphenyl groups, the 2,4- and 3,5-dimethylphenyl groups, and like alkaryl groups, and the like.

In those compounds (phosphites and phosphonites) wherein m and n both are 1, X and Y are both oxygen or sulfur, and R and R' together represent a divalent group, it is preferred that the divalent group be an alkylene group of up to 10 carbon atoms, with from 1 to 5—preferably 2 or 3—carbon atoms in the chain thereof which bonds together the carbon atoms thereof which are bonded to the indicated oxygen or sulfur atoms represented by X and Y.

In those compounds (amides) wherein at least one of m and n is 1, and at least one of X and Y is

and R and $R^a$ (and/or R' and $R^a$) together represent a divalent group, it is preferred that the divalent group be an alkylene or alkylene-oxy-alkylene group of up to 10 carbon atoms, with from 4 to 5 carbon atoms in the chain thereof. Where the divalent chain contains 5 carbon atoms, it suitably may form with the nitrogen atom a piperidino group or morpholino group.

The suitable substituted hydrocarbon groups are those of the foregoing hydrocarbon groups which are substituted by one or more non-hydrocarbon substituents. The preferred substituents are halogen, particularly the middle halogens, bromine and chlorine; the nitro group, the cyano group; the amino groups represented by the formula:

$$-N(-H)_o$$
$$\quad |$$
$$\quad (R)_p$$

wherein R has the meaning set out herein, o is 0, 1 or 2, and $o+p=2$; non-acidic functional groups involving oxy (—O—) oxygen, and amido groups having the amino moiety set out above, and including amido groups of the formulae:

By "non-acidic" functional groups involving oxy (—O—) oxygen is meant the hydroxy group, ether groups (—O—R), ester groups (—C(O)OR), and ether and/or ester groups containing other ether linkages.

Illustrative examples of the non-hydrocarbon groups include monohaloalkyl groups, such as the chloromethyl and bromomethyl groups, the 2-chloroethyl, 1-bromopropyl, 3-chloropropyl groups and the like; 1,2-dichloroethyl, 2,2-dibromomethyl, 3,3-dichloro-2-bromopropyl groups and the like; nitroalkyl groups such as the 2-nitroethyl group; halo-substituted aromatic groups such as the various isomeric chloro- and bromophenyl groups, the various isomeric polyhalophenyl groups, such as the 2,4- and 2,6-dichlorophenyl groups, the 3,5-dibromophenyl group and the like, amino-substituted groups, such as the 2-aminoethyl group, the 2-dimethylaminoethyl group and the like; the anilino group, the p-dimethylaminophenyl group, the p-ethylaminobenzyl group; the isomeric nitro-substituted phenyl groups, the isomeric nitro-substituted benzyl groups, the methoxymethyl group, the 2-methoxyethyl group, the methoxycarbonyl group, the methoxycarbonylmethyl group, the 2-methoxycarbonylethyl group, the 2-methoxycarbonylethoxyethyl group, the benzyloxycarbonyl group and the like.

In these esters and amides, "alkyl" represents an alkyl group of from 1 to 10 carbon atoms, which may be unsubstituted or substituted by one or more of the aforementioned substituent groups. Preferably the alkyl group is unsubstituted, and because of the greater reactivity of the ester or amide, it is preferred that the alkyl group contain not more than six carbon atoms.

Typical examples of suitable neutral esters of acids of trivalent phosphorus include trimethyl phosphite, triethyl phosphite, dimethyl ethyl phosphite, dimethyl methylphosphonite, diethyl benzylphosphonite, dimethyl benzyl phosphite, dibenzyl methyl phosphite, dimethyl phenyl phosphite, dimethyl butylphosphonite, methyl diethylphosphinite, diphenyl methyl phosphite, methyl phenyl p-chlorophenyl phosphite, methyl ethyl propyl phosphite, tributyl phosphite, dimethyl 2-chloroethyl phosphite, dimethyl trichloromethylphosphonite, dimethyl cyclohexyl phosphite, diethyl cyclohexylphosphonite, 2-ethoxy-1,3,2-dioxaphospholane (ethyl 1,2-ethylene phosphite), 2-(3,5-dichlorophenoxy)-4-methyl-1,3,2-dioxaphospholane, and 2-ethoxy-4-acetoxymethyl-1,3,2-dioxaphospholane, diethyl 2,4-dichlorophenyl phosphite, di-isopropyl xylyl phosphite, dimethyl pentachlorophenyl phosphite, diethyl p-chlorophenylphosphonite, dimethyl alpha-methylbenzyl phosphite, dimethyl p-nitrophenyl phosphite, dimethyl p-nitrobenzyl phosphite, and the like, and their sulfur analogs.

Of particular interest because of the desirable properties of the phosphonates prepared therefrom are the phosphites ($m$ and $n$ both are 1, X and Y both are oxygen) wherein R and R' each is lower hydrocarbon—particularly alkyl of up to seven carbon atoms, aryl of up to ten carbon atoms, aralkyl of up to ten carbon atoms, these aryl and aralkyl substituted by nitro and/or middle halogen, particularly the phenyl group, the benzyl group, the nitrophenyl groups, the mono- and di-chlorophenyl groups and the nitro- and mono- and di-chlorobenzyl groups.

For the same reason, the mono- and diamido alkyl phosphites wherein each amino group is low molecular weight—containing up to ten carbon atoms—and is the amino group (—NH$_2$), a monoalkyl- or dialkyl-amino group, are preferred. The amino group may be cyclic.

Illustrative examples of these amidophosphites include dimethyl amidophosphite, methyl diamidophosphite, dimethyl N,N-dimethylamidophosphite, diethyl N-methylamidophosphite, methyl piperidinamidophosphite and the like.

The suitable ketones are those in which an aliphatic carbon atom is bonded to the carbonyl carbon atom and hydrogen or middle halogen. These ketones can be described by the formula:

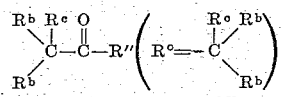

wherein each of $R^b$ is the same or different, and is hydrogen, non-hydrocarbon, such as middle halogen, cyano, amino (as already defined herein), amido (as already defined herein), a non-acidic functional group involving oxy (—O—) oxygen, or one of the groups represented by R, $R^c$ is hydrogen or middle halogen, and R'' represents one of the lower molecular weight hydrocarbon and substituted-hydrocarbon groups represented by R.

It is to be understood that both of $R^b$ together can represent a single divalent group, the preferred divalent groups being those represented by R and R' together, as in the suitable phosphites.

Suitable ketones include dialkyl ketones, such as dimethyl ketone, methyl ethyl ketone, diethyl ketone, methyl n-propyl ketone, methyl isopropyl ketone, methyl n-butyl ketone, methyl isobutyl ketone, pinacolone, methyl n-amyl ketone, dipropyl ketone, diisopropyl ketone, methyl hexyl ketone, diisobutyl ketone and other dialkyl ketones wherein the alkyl groups are the same or different, are straight-chain or branched-chain in configuration, and are the same or different in configuration, containing up to about ten carbon atoms in each alkyl group; also suitable are such ketones in which one or both of the alkyl groups are substituted by, for example, halogen, as in chloroacetone, 1,1-dichloroacetone, 1,1'-dichloroacetone, 1,1-dibromoacetone, 1,1,1-trichloroacetoacetone, 3,3-dibromo-2-octanone, 1,1,1-trichloro-2-hexanone, 1,1,3,3-tetrachloro-2-butanone, or the like, or are substituted by, for example, hydroxy, as in acetol, acetoin, and diacetone alcohol. Olefinically unsaturated ketones also are suitable, including methyl allyl ketone, methyl methallyl ketone, methyl 2-butenyl ketone, and the like. Mixed ketones—for example, alkyl aryl ketones, alkyl cycloalkyl ketones, alkyl aralkyl ketones—are suitable, examples including acetophenone, alpha-chloroacetophenone, 2-acetonaphthone, dichloroacetophenone, 2,4-alpha,alpha-tetrachloroacetophenone, 2,4-alpha-trichloroacetophenone, dichloroacetonaphone, alpha,alpha-dichlorobutyrophenone, methyl cyclohexyl ketone, dichloromethyl cyclohexyl ketone, methyl benzyl ketone, methyl alpha-methylbenzyl ketone, methyl p-methylphenyl ketone, and the like. Polyketones, such as biacetyl, bipropionyl, acetylpropionyl, acetylbenzoyl, benzoyl phenylacetyl, 2,4-pentanedione (acetylacetone), 2,4-hexanedione, 1-cyclohexyl-1,3-butanedione, 5,5-dimethyl-1,3-cyclohexanedione, 1-phenyl-1,3-butanedione, 1-(4-biphenylyl)-1,3-butanedione, 1-phenyl-5,5-dimethyl-2,4-hexanedione, acetonyl-acetone, 2,5-octanedione, 3-chloropentane-2,4-dione, 1,1-dichloropentane-2,4-dione, 3-bromoheptane-2,4-dione, 1,1-dichloro-4-bromo-2,6-heptanedione, 1,1,6,6-tetrachlorohexane-2,5-dione, and the like, also are suitable. Ketoesters likewise are suitable, including alkyl, aryl, aralkyl esters of acetoacetic acid, propionylpropionic acid, alpha-n-butyryl-n-butyric acid, and the various alkyl homologs, such as the alpha-, alpha,alpha-, beta-, and gamma-alkyl substituted homologs, and the halo-substituted analogs, and the corresponding esters of pyruvic acid, halo- and dihalopyruvic acids, levulinic acid, 4-ketohexanoic acid, alpha- and beta-methyllevulinic acids, 4-ketoheptanoic acid, mesitonic acid, beta,beta-dimethyllevulinic acid, propionyl formic acid, ethylideneacetoacetic acid, and the like. The amides of such acids wherein the amino moieties of the amido groups are those amino moieties already defined herein also are suitable. In addition to the foregoing, the ketone reactant suitably may also contain one or more other substituents, and/or linking groups, such as oxy (—O—), nitro, hydroxy, nitrilo and the like, exemplary species which can be mentioned including ethyl cyanoacetyldichloroacetate, 4-nitro-3-bromo-alpha,alpha-dichloroacetophenone, and 6-hydroxy-3-bromo-2-hexanone.

According to the invention, the reaction of the phosphorus reactant and the ketone is carried out simply by mixing the selected phosphorus reactant, ketone and alcohol together and thereafter maintaining the reaction mixture at the desired reaction temperature. Temperatures upwards from 0° C. can be used, up to temperatures as high as 120° C., or even more. Often temperatures not substantially different from ordinary room temperatures—temperatures say from about 10° C. to about 50° C.—are quite suitable and are most convenient. The ether which forms as by-product can be allowed to remain in the reaction mixture and removed after the reaction is complete, or it can be removed as formed by conducting the operation at or above the temperature at which the ether boils.

The stoichiometric amounts of the phosphorus reactant and the ketonic reactant can be employed; however, it is ordinarily best to employ a small to moderate excess of the phosphorus reactant—say, from about 5 percent to up to 100 percent excess. At least the stoichiometric amount of the alcohol must be used, and in the great majority of cases, it will be found advantageous to employ a substantial excess of the alcohol; the presence of the excess alcohol tends to force the desired reaction to a greater extent and the alcohol is an excellent solvent in which to conduct the reaction. Thus, it will ordinarily be found desirable to employ at least 100 percent excess of the alcohol, and in many cases, it will be found best to employ at least 500 percent excess of the alcohol. The maximum amount of alcohol which can be employed is not limited by the chemical factors involved, but is limited by the practical considerations involved in recovering the product efficiently. Thus, it will usually be found desirable that not more than about a 5000 percent excess of alcohol be employed, and ordinarily somewhat less— say, up to a 4000 percent excess—will be equally effective in the conduct of the desired reaction, and will reduce the amount of material which must be removed to separate the desired product.

When the phosphorus reactant is trimethyl phosphite, and the dimethyl ester is the desired product, it is desirable that methanol be used as the alcohol, for if ethanol is used, a substantial amount of ester interchange can occur. Of course, if the diethyl ester is desired, if a mixed methyl-ethyl ester product is desired, or if it is immaterial whether the product is the dimethyl, diethyl or mixed ester, or a mixture of the esters, ethanol can be used as the alcohol. For the same reasons, it is desirable that when the phosphorus reactant is triethyl phosphite, ethanol be used as the alcohol. In the case where the phosphorus reactant is an amide, ester interchange is not known to be a problem.

The problem can be carried out batchwise, semi-continuously, or continuously. The time required for completion of the reaction is in most cases relatively short— e.g., from a few minutes to an hour or two—although a longer reaction time may be used, as required in any given case.

The desired product can be separated from the reaction mixture, when its separation is desired, by conventional techniques, such as distillation, extraction with selective solvents, or the like. In most cases, however, distillation techniques carried out at reduced pressures to lower required temperatures and thereby minimize the possibility of degrading the product will be found most convenient, at least to free the product from the alcohol and the ether by-product. The product obtained on distillation can be purified by further distillation and/or by crystallization techniques. Depending inter alia upon the intended use, separation of the product from the crude reaction mixture and/or purification of the crude product separated from the alcohol and ether may be dispensed with partially or entirely.

It is desirable that the alcohol be present from the outset of the reaction. The reactants and the alcohol can all be mixed simultaneously; however, because of the exothermic nature of the reaction, such a technique may not be useful on a large scale. In such a case, it is desirable to mix the alcohol with one reactant, then add the other reactant at such a rate that the reaction temperature can be controlled as desired. From the experimental data obtained, it appears preferable to mix the alcohol with the halocarbonyl compound and then gradually commingle the phosphorus ester with that mixture, as by slowly introducing the ester into the stirred mixture.

Preparation of alpha-hydroxyphosphonates by the process of this invention is illustrated by the following application of that process in particular instances. In these examples, "parts by weight" bear the same relationship to "parts by volume" as does the kilogram to the liter.

*Example I.—Preparation of dimethyl (alpha-(chloromethyl)-alpha-hydroxy-benzyl)phosphonate*

To a stirred solution of 39 parts by weight of 2-chloroacetophenone in 250 parts by volume of methanol, was added 37 parts by volume of trimethyl phosphite over a period of 35 minutes. The temperature of the reaction mixture was maintained at 25–30° C. Two hours after the addition of the trimethyl phosphite was complete, the mixture was stripped at a pressure of 0.1 torr. Recrystallization of the product twice from chloroform gave 14 parts by weight of dimethyl (alpha-(chloromethyl)-alpha-hydroxy-benzyl)phosphonate, melting point: 161.5–163.5° C. The identity of the product was confirmed by elemental analysis and by infrared spectrum analysis.

*Elemental analysis.*—Calculated: $C_{10}H_{14}ClO_4$: P, 11.7; Cl, 13.5. Found: P, 11.8; Cl, 13.5.

*Example II.—Preparation of methyl 3-(dimethoxyphosphinyl)-3-hydroxybutyrate*

40 parts by volume of trimethyl phosphite was added to a stirred solution of 19 parts by weight of methyl acetoacetate in 200 parts by volume of methanol at 25° C. The mixture was heated to reflux for about an hour, then allowed to cool and stand at room temperature. The mixture then was stripped at water aspirator vacuum and then at 0.1 torr. The residue then was Claisen distilled to a pot temperature of 120° C., pressure 0.1 torr. The solid bottoms product was recrystallized three times from carbon tetrachloride to give methyl 3-(dimethoxyphosphinyl)-3-hydroxybutyrate, melting at 55–56° C. The identity of the product was confirmed by elemental analysis and infrared spectrum analysis.

*Elemental analysis.*—Calculated: P, 13.7; C, 37.2; H, 6.7. Found: P, 13.5; C, 37.4; H, 6.9.

*Example III.—Preparation of methyl 2,2-dichloro-3-dimethoxyphosphinyl)-3-hydroxybutyrate*

75 parts by weight of trimethyl phosphite was added to a stirred solution of 92 parts by weight of methyl 2,2-dichloroacetoacetate in 500 parts by volume of methanol over a period of one hour, the mixture being maintained at 25–30° C. The mixture then was allowed to cool to room temperature overnight. It then was heated and refluxed for 45 minutes, then was stripped under water aspirator vacuum and then at 0.1 torr. The residue then was distilled to a pot temperature of 70° C. at 0.2 torr. The bottoms product then was distilled in a molecular still at 60° C. and 1 micron pressure. On cooling, the bottoms product from the molecular distillation was partially liquid, partially solid. The liquid was decanted and the solid was recrystallized twice from carbon tetrachloride to give as product methyl 2,2-dichloro-3-(dimethoxyphosphinyl)-3-hydroxybutyrate, melting at 79–82° C., whose identity was confirmed by elemental analysis and infrared spectrum analysis.

*Elemental analysis.*—Calculated: P, 10.5; Cl, 24.0. Found: P, 10.7; Cl, 23.7.

*Example IV.—Preparation of dimethyl (2-chloro-dimethylcarbamoyl-1-hydroxy-1-methylethyl)phosphonate*

To a solution of 41 parts by weight of alpha-chloro-N,N-dimethylacetoacetamide in 250 parts by volume of methanol there was added 37 parts by volume of trimethyl phosphite, over a fifteen-minute period, the mixture being at room temperature. The mixture was then stirred at room temperature for an additional six hours. The mixture then was stripped under water aspirator vacuum and then at 0.1 torr to a pot temperature of 95° C. The residue then was distilled on a falling film still at 45–50° C. and 1 micron pressure. Dimethyl (2-chloro-dimethylcarbamoyl - 1 - hydroxy - 1 - methylethyl)phosphonate was identified by elemental analysis and infrared spectrum analysis.

*Example V.—Preparation of m-nitrobenzyl 2-chloro-3-(dimethoxyphosphinyl)-3-hydroxybutyrate*

To 67 parts by weight of m-nitrobenzyl alpha-chloroacetoacetate in 250 parts by volume of methanol there was added 39 parts by weight of trimethyl phosphite, over a period of 10 minutes, the temperature being maintained at 25–30° C. The mixture then was stirred under water aspirator vacuum and then on a steam bath at 0.06 torr. The residue was treated with diethyl ether and the product that crystallized was recrystallized from carbon tetrachloride, to give m-nitrobenzyl 2-chloro-3-(dimethoxyphosphinyl)-3-hydroxybutyrate. The identity of the product was confirmed by elemental analysis and by infrared spectrum analysis.

*Example VI.—Preparation of alpha-methylbenzyl 2-chloro-3-(dimethoxyphosphinyl)-3-hydroxybutyrate*

To a solution of 100 parts by volume of trimethyl phosphite in 500 parts by volume of methanol there was added 120 parts by weight of alpha-methylbenzyl alpha-chloroacetoacetate, over a thirty-minute period, the mixture being held at 23–25° C. The mixture then was stirred (25° C.) for an additional two hours and fifteen minutes. The mixture was then stripped at water aspirator vacuum and then at 0.1 torr. The residue was stripped on a steam bath at 0.5 torr. The residue was treated with diethyl ether, filtered and the filtrate stripped of solvent. The residue was treated with carbon tetrachloride, filtered and the filtrate was stripped of solvent. The residue was stripped on a falling film still at 125+5° C. and 1 micron pressure. The bottoms product was recrystallized from carbon tetrachloride to give alpha-methylbenzyl 2-chloro-3-(dimethoxyphosphinyl)-3-hydroxybutyrate, melting at 151–152° C. The identity of the product was confirmed by infrared spectrum analysis and elemental analysis.

*Example VII.—Preparation of methyl 2-chloro-3-(dimethoxyphosphinyl)-3-hydroxybutyrate*

A solution of 100 parts by volume of trimethyl phosphite, 80 parts by volume of methyl 2-chloroacetoacetate and 1,000 parts by volume of methanol was stirred at 25° C. for twenty-four hours. The solution was then heated to reflux for one hour and then evaporated under reduced pressure and finally stripped at 80° C. and 0.1 torr. 142 parts by weight of a mixture of the two diastereomers of methyl 2-chloro-3-(dimethoxyphosphinyl)-3-hydroxybutyrate was obtained. The isomers were separated by crystallization twice from carbon tetrachloride to yield 26 parts by weight of the higher melting isomer, melting point. 101.5–102.5° C.

*Analysis.*—Calculated for $C_7H_{14}ClO_6P$: C, 32.2; H, 5.4; Cl, 13.7; P, 11.9. Found: C, 31.8; H, 5.5; Cl, 14.0; P, 11.2.

The other isomer, melting point: 73.5–74.5° C., was separated by chromatography on silica gel of a portion of the filtrates from crystallization of the high melting isomer, followed by crystallization from cyclohexane.

*Analysis.*—Found: C, 32.2; H, 5.8; Cl, 13.5; P, 11.6.

*Example VIII.—Preparation of ethyl 2-chloro-3-diethoxyphosphinyl)-3-hydroxybutyrate*

To a solution of 100 parts by weight of ethyl 2-chloroacetoacetate in 475 parts by volume of methanol, 202 parts by weight of triethyl phosphite was added at 25–30° C. over a period of 0.3 hour. The reaction mixture was allowed to stand at room temperature for two days and then was stripped at 90° C. (0.1 torr). The resulting crude product was distilled at 100° C. (1 micron) on a falling film molecular still to give 66 parts by weight of distillate and 22 parts by weight of residue. A portion of the distillation residue was purified by chromatography on silica gel, first by elution with methylene chloride and then the phosphonate product was recovered by elution with methylene chloride containing five percent methanol. The infrared spectrum of the alpha-hydroxyphosphonate product indicated that it was a mixture of methyl and ethyl phosphonates formed by transesterification of the triethyl phosphite in the solvent methanol. This reaction was also carried out under the same conditions in ethanol solution.

While many of the compounds which can be prepared by the process of this invention are already known, the process provides an effective route to the preparation of a new class of compounds having insecticidal activity, and this new class of compounds also constitutes a part of this invention. This new class of compounds are the lower molecular weight dialkyl 2-alkoxycarbonyl-1-hydroxy-1-alkylethylphosphonates and their 2-(middle halo) analogs, having the formula:

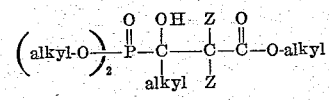

wherein alkyl contains from one to four carbon atoms, and Z represents hydrogen or a middle halogen, i.e., bromine or chlorine.

According to the process of this invention, these insecticidal compounds are prepared by reacting a trialkyl phosphite $((alkyl-O—)_3P)$ with an alkyl ester of a beta-keto carboxylic acid or the 2-halo analog

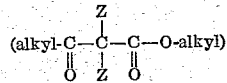

wherein alkyl and Z each has the respective meanings just set out, in the presence of methanol or ethanol, preferably methanol. This forms a preferred aspect of the process of this invention.

These insecticidal compounds can exist in diastereoisomeric forms and the process of this invention ordinarily results in the preparation of a mixture of the diastereoisomeric forms. The isomers can be separated, where such is necessary or desirable, by usual methods, including crystallization techniques, use of selective solvents, elution techniques, and the like.

The following examples demonstate the insecticidal properties of a typical compound of this class of new compounds:

*Example IX*

A solution of the test compound, a mixture of the disastereomers of methyl 2 - chloro - (dimethoxyphosphinyl)-3-hydroxybutyrate, was made up employing either a neutral petroleum distillate boiling within the kerosene range or acetone as the solvent. The solution was tested for toxicity against the two-spotted spider mite, *Tetranychus telarius*, and the pea aphis, *Macrosiphum pisi*, by spraying groups of plants infested with these insects under controlled conditions which varied from one test to the other only with respect to its concentration. Thus, in each of the several tests, the same volume of spray was used. In a similar manner, the compound was tested for toxicity against the corn earworm, *Heliothis zea* by caging larvae thereof on cut broad bean plants inserted in water after the plant had been sprayed with the solution of the test compound. Also, tests were carried out using the common housefly, *Musca domestica*, as the test insect, the method used being that described by Y. P. Sun, Journal of Economic Entomology, volume 43, pp. 45 et seq. (1950). Table I shows the concentration of the test compound required to cause approximately 50 percent mortality of the test insect—i.e., the $LC_{50}$ concentration.

TABLE I

| Test insect: | Approximate median lethal concentration (LC$_{50}$) in grams per 100 milliliters of solvent |
|---|---|
| Pea aphid | 0.00108 |
| Two-spotted spider mite | 0.18 |
| Housefly | 0.14 |
| Corn earworm | 0.0079 |

Example X

Grape leaves were sprayed with water solutions of the test compound of Example VIII at a rate approximating 100 gallons per acre, at a dosage of 0.25 pound per gallon. Three replicates were sprayed per dosage. Adult leaf hoppers were confined on the leaves. At certain intervals after the plants were sprayed; mortality counts were made twenty-four hours after the hoppers were placed on the leaves. The results when no insecticide was used, and the results when parathion (at the same rate and at a dosage of one part of .25% xylene emulsible concentrate) was used, are summarized in Table II.

TABLE II

| Test Compound | Mortality at indicated days after spraying | | |
|---|---|---|---|
| | 0 | 1 | 7 |
| None | 4 | | |
| Test Compound of the Invention | 89 | 97 | 47 |
| Parathion | 76 | 60 | 20 |

From the results of these tests, it is evident that the test compound of this invention is initially more effective than parathion, and its superiority is even more evident with time, the test compound of this invention exhibiting a much longer residual effectiveness than parathion.

Example XI

The test compound of this invention was tested for its effectiveness against corn earworms in situ in the corn, by injecting a water solution of the compound into the area where the cornsilks leave the husks at a time when the silks had just wilted and begun to turn brown. After the ears matured they were picked and examined for earworm damage, and also for damage due to the chemical. It was found that the test compound did not injure the husk or kernels of the corn, and that it reduced earworm damage from the 85% damage found on untreated ears to about 5-20% damage, thus reducing the damage about 75-95%.

Example XII

The systematic properties of the test compound of the invention were ascertained by placing pinto bean plants in water containing the toxicant at various concentrations, placing two-spotted spider mites on the plants, and 48 hours later determining the percent kill. By this procedure the LC$_{50}$ is determined. For the test compound, the LC$_{50}$ (parts per million of the test compound by weight in the water) was found to be: 6, indicating that the test compound is a very effective systemic insecticide under these conditions.

It is thus evident that the new compounds of this invention are effective insecticides, the term "insect" including not only the members of the class Insecta, but also related or similar non-vertebrate animal organisms belonging to the allied classes of arthropods and including mites, ticks, spiders, wood lice, and the like.

The compounds of this invention can be employed for insecticidal purposes by the use of any of the methods which are conventionally employed in that art. For example, the compounds can either be sprayed or otherwise applied in the form of a solution or dispersion, or they can be absorbed on inert, finely-divided solids and applied as dusts. Useful solutions for application by spraying, brushing, dipping, and the like, can be prepared by using as the solvent any of the well-known inert horticultural carriers, including neutral hydrocarbons such as kerosene and other light mineral oil distillates of intermediate viscositiy and volatility. Adjuvants, such as spreading or wetting agents, can also be included in the solutions, representative materials of this character being fatty acid soaps, rosin salts, saponins, gelatin, casein, long-chain fatting alcohols, alkyl and sulfonates, long chain alkyl sulfonates, phenol ethylene oxide condensates, ammonium salts, and the like. These solutions can be employed as such, or more preferably, they can be dispersed or emulsified in water and the resulting aqueous dispersion or emulsion applied as a spray. Solid carrier materials which can be employed include talc, bentonite, lime gypsum, pyrophyllite and similar inert solid diluents. If desired, the compounds of the present invention can be employed as an aerosol, as by dispersing the same into the atmosphere by means of a compressed gas.

The concentrations of the compounds to be used with the above carriers are dependent upon many factors, including the particular compound used, carrier employed, the method and conditions of application, and the insect species to be controlled. Proper consideration and resolution of these factors is within the skill of those versed in the insecticide art. In general, however, the compounds of this invention are effective in concentrations of from about 0.01% to 0.5% based upon the total weight of the composition, though under some circumstances as little as about 0.00001% or as much as 2% or even more of the compound can be employed with good results from an insecticidal standpoint. Concentrates suitable for sale for dilution in the field may contain as much as 25-50% by weight, or even more, of the insecticide.

When employed as insecticides, the compounds of this invention can be employed either as the sole toxic ingredients of the insecticidal compositions or can be employed in conjunction with other insecticidally-active materials. Representative insecticides of this latter class include the naturally-occurring insecticides such as pyrethrum, rotenone, sabadilla, and the like, as well as the various synthetic insecticides, including DDT, benzene hexachloride, thiodiphenylamine, cyanides, tetraethyl pyrophosphate, diethyl-p-nitrophenyl thiophosphate, dimethyl 2,2-dichlorovinyl phosphate, 1,2-dibromo-2,2-dichloroethyl dimethyl phosphate, azobenzene, and the various compounds of arsenic, lead and/or fluorine.

I claim as my invention:

1. A process in which
   (a) an organophosphorus ester of the formula:

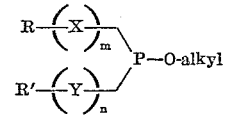

wherein R and R' each independently represents hydrocarbon containing up to 10 carbon atoms and of the group consisting of alkyl, cycloalkyl, phenyl, phenalkyl and alkyl-substituted phenyl and any of the above substituted by from one to a plurality of substituents of the group consisting of middle halogen and nitro, X and Y each independently represents a member of the group consisting of —O—, —S— and

wherein R$_a$ represents a member of the group represented by R, $m$ and $n$ each represents an integer from zero to one, and "alkyl" represents lower alkyl, and (b) a ketone of the formula

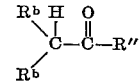

wherein each of $R^b$ independently represents a member of the group consisting of hydrogen, a member of the group represented by R, middle halogen, cyano, amino of the formula $-N(H)_o(R)_p$ wherein $o$ is an integer from zero to two and $o+p=2$, hydroxy, ether of the formula $-O-R$ and ester of the formula $-C(O)-R$, and R″ represents a member of the group represented by R, (c) an alcohol of the group consisting of methanol and ethanol are commingled at a temperature within the range of from about 0° C. to about 120° C., thereby effecting reaction between said organophosphorus ester, said ketone and said alcohol.

2. A process in which
(a) a trialkyl phosphite wherein each alkyl group contains from one to four carbon atoms, and
(b) an ester of the formula

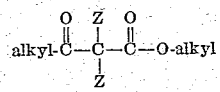

wherein each "alkyl" independently is alkyl containing from one to four carbon atoms and Z is a member of the group consisting of hydrogen and middle halogen, (c) methanol are commingled at a temperature within the range of from about 0° C. and about 120° C., thereby effecting reaction between said trialkyl phosphite, said ester and said methanol.

3. A process in which trimethyl phosphite, methanol and methyl 2-chloroacetoacetate are commingled at a temperature within the range of from about 0° C. to about 120° C., thereby effecting reaction between said trimethyl phosphite, said methanol and said methyl 2-chloroacetoacetate.

4. Methyl 2 - chloro - 3 - (dimethoxyphosphinyl) - 3 - hydroxybutyrate.

References Cited in the file of this patent

UNITED STATES PATENTS

| | | |
|---|---|---|
| 2,356,754 | Farrington et al. | Aug. 29, 1944 |
| 2,668,800 | Johnston | Feb. 9, 1954 |
| 2,754,319 | Johnston | July 10, 1956 |
| 2,802,855 | Whetstone et al. | Aug. 13, 1957 |
| 2,971,019 | Ladd et al. | Feb. 7, 1961 |
| 2,993,066 | Dever et al. | July 18, 1961 |
| 3,014,949 | Birum et al. | Dec. 26, 1961 |
| 3,031,489 | Birum et al. | Apr. 24, 1962 |

FOREIGN PATENTS

| | | |
|---|---|---|
| 166 | Japan | Jan. 17, 1961 |

OTHER REFERENCES

Pudovik: Chem. Abst., vol. 51, col. 1827 (1957).
Pudovik: J. Gen. Chem. U.S.S.R. (English translation), vol. 25, pp. 2137–2143 (1955).
Allen et al.: J. Am. Chem. Soc., vol. 77, pp. 2871–2875 (1955).